US010608883B2

(12) United States Patent
Chuang et al.

(10) Patent No.: US 10,608,883 B2
(45) Date of Patent: *Mar. 31, 2020

(54) FLEXIBLY DEPLOYABLE NETWORK ANALYZER

(71) Applicant: International Business Machines Corporation, Armonk, NY (US)

(72) Inventors: Henry Chuang, Taipei (TW); Ho Ming Da, Taipei (TW); Chia Chen Ho, Taichung (TW); Ming-Pin Hsueh, Taipei (TW); Ting-Jui Hu, Taipei (TW); Ping-Hung Lee, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,828

(22) Filed: Aug. 27, 2018

(65) Prior Publication Data

US 2019/0014009 A1 Jan. 10, 2019

Related U.S. Application Data

(63) Continuation of application No. 14/867,149, filed on Sep. 28, 2015, now Pat. No. 10,313,194.

(51) Int. Cl.
*H04L 12/24* (2006.01)
*H04L 12/26* (2006.01)

(52) U.S. Cl.
CPC .......... *H04L 41/0896* (2013.01); *H04L 41/14* (2013.01); *H04L 43/0888* (2013.01); *H04L 43/18* (2013.01); *H04L 41/5003* (2013.01); *H04L 43/16* (2013.01)

(58) Field of Classification Search
CPC . H04L 41/0896; H04L 41/14; H04L 43/0888; H04L 43/18
See application file for complete search history.

(56) References Cited

U.S. PATENT DOCUMENTS

| | | | |
|---|---|---|---|
| 7,636,318 | B2 | 12/2009 | Nandy |
| 7,809,938 | B2 | 10/2010 | Della-Libera |
| 8,417,938 | B1 | 4/2013 | Considine |
| 8,612,744 | B2 | 12/2013 | Shieh |
| 9,264,320 | B1 | 2/2016 | Shevenell |

(Continued)

OTHER PUBLICATIONS

Su et al., "Resource Allocation in Communications and Computing", Editorial, Hindawi Publishing Corporation, Journal of Electrical and Computer Engineering, vol. 2013, Article ID 328395, 2 pages, <http://dx.doi.org/10.1155/2013/328395>.

(Continued)

*Primary Examiner* — Jael M Ulysse
(74) *Attorney, Agent, or Firm* — David B. Woycechowsky

(57) ABSTRACT

Computing a protocol complexity indicator (PCI) for a communication protocol of interest in a networked computer system that processes network traffic of multiple protocols. The PCI provides an indication of predicted bandwidth usage by traffic of the protocol of interest. The PCI is used together with a throughput limit to establish a threshold amount for traffic of the protocol of interest. The PCI may then be used, for instance, to determine when to spawn a new instance of a network traffic-processing component for that protocol to maintain processing throughput at an acceptable level.

6 Claims, 15 Drawing Sheets

(56) References Cited

U.S. PATENT DOCUMENTS

| | | | |
|---|---|---|---|
| 2002/0136184 A1 | 9/2002 | Liang | |
| 2003/0088529 A1* | 5/2003 | Klinker | H04L 45/00 706/3 |
| 2004/0054776 A1* | 3/2004 | Klotz | H04L 41/06 709/224 |
| 2005/0005012 A1 | 1/2005 | Odhner | |
| 2006/0120282 A1* | 6/2006 | Carlson | H04L 12/2801 370/229 |
| 2008/0052387 A1* | 2/2008 | Heinz | H04L 41/5025 709/223 |
| 2008/0151753 A1* | 6/2008 | Wynne | H04L 49/30 370/235 |
| 2009/0290491 A1 | 11/2009 | Karagiannis | |
| 2010/0205292 A1 | 8/2010 | Diaz | |
| 2011/0219142 A1 | 9/2011 | Lin | |
| 2011/0225299 A1 | 9/2011 | Nathuji | |
| 2012/0092343 A1* | 4/2012 | Pruthi | H04L 41/22 345/440 |
| 2012/0106342 A1* | 5/2012 | Sundararajan | H04L 47/193 370/235 |
| 2012/0281535 A1* | 11/2012 | Day | H04Q 3/0095 370/235 |
| 2013/0086272 A1 | 4/2013 | Chen | |
| 2013/0174257 A1 | 7/2013 | Zhou | |
| 2013/0272144 A1 | 10/2013 | Dong | |
| 2013/0275578 A1 | 10/2013 | Williams | |
| 2014/0189865 A1 | 7/2014 | Abuelsaad | |
| 2015/0098390 A1* | 4/2015 | Efrati | H04W 72/02 370/329 |
| 2015/0263987 A1* | 9/2015 | Klein | H04L 29/08 709/226 |
| 2015/0332145 A1 | 11/2015 | Vasseur | |
| 2015/0333953 A1 | 11/2015 | Vasseur | |
| 2015/0334030 A1 | 11/2015 | Vasseur | |
| 2017/0093675 A1 | 3/2017 | Chuang et al. | |

OTHER PUBLICATIONS

List of IBM Patents or Patent Applications Treated as Related, Filed Aug. 27, 2018, 2 pages.

List of IBM Patents or Patent Applications Treated as Related, Filed Aug. 30, 2018, 2 pages.

"Packet analyzer", Wikipedia, the free encyclopedia, page last modified on Aug. 11, 2015, at 15:49, 5 pages, <hllps://en.wikipedia.org/wikifPacket_analyzer>.

Guo et al., "SecondNet: A Data Center Network Virtualization Architecture with Bandwidth Guarantees", ACM CoNEXT 2010, Nov. 30-Dec. 3 2010, Philadelphia, USA, Copyright 2010 ACM 1-4503-0448—Jan. 10, 2011, 12 pages.

* cited by examiner

250

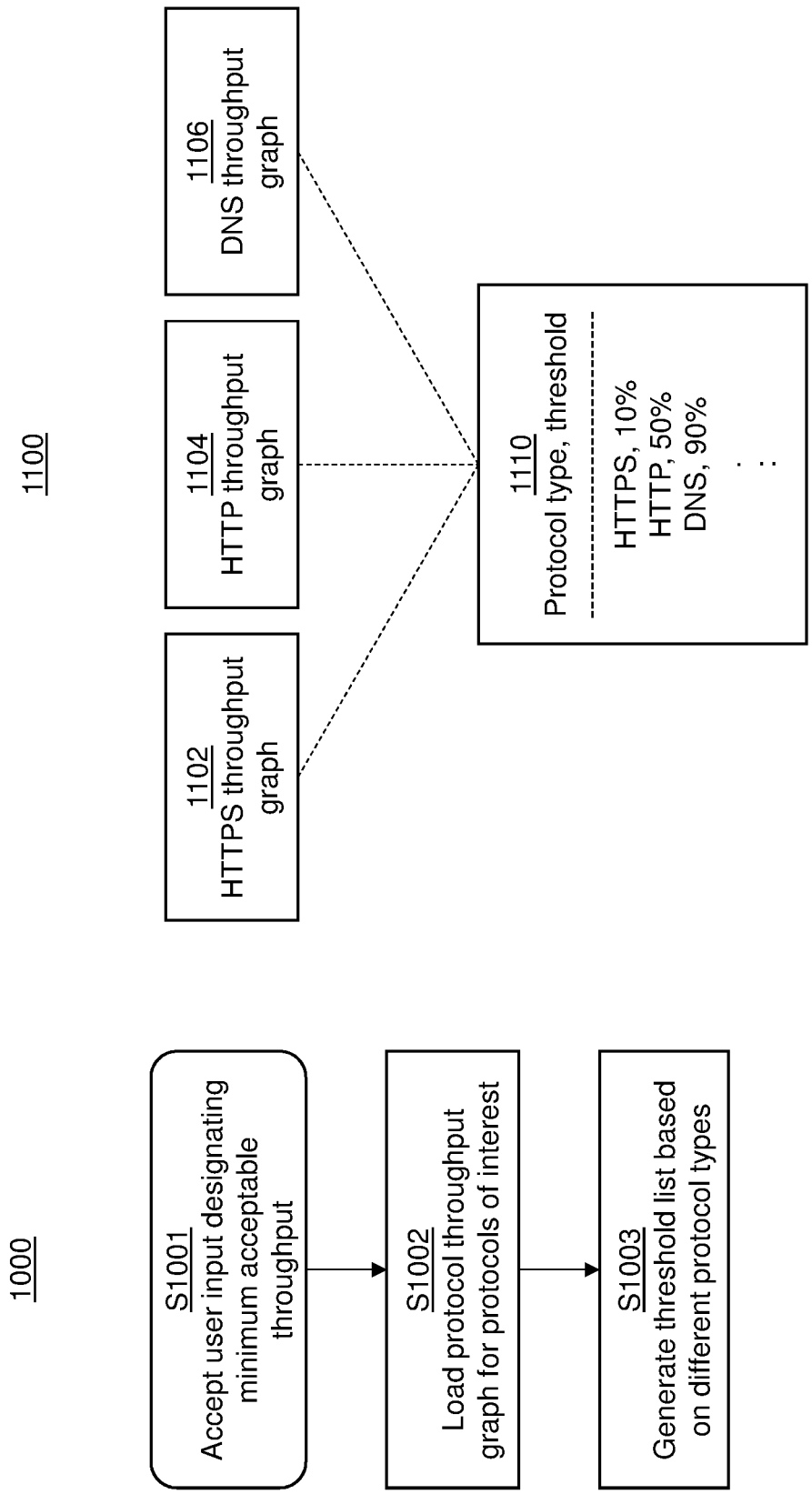

FLEXIBLY DEPLOYABLE NETWORK ANALYZER

BACKGROUND

The present invention relates generally to the field of network traffic analysis, and more particularly to controlling traffic flows through a network.

A communication protocol is a system of rules that define a method for transmitting information between or among two or more entities. These rules may cover aspects of communication such as syntax, semantics, sequencing, synchronization, routing, and/or error recovery. Protocols are often designed to be stacked on top of each other in layers, breaking up the tasks of information transmission into simpler, cooperative modular components having distinct responsibilities that together make up a protocol family, or protocol suite. Two well-known protocol suites are X.25 (a protocol suite for packet-switched wide area network (WAN) communications) and the Internet protocol suite (often referred to as "TCP/IP" for the most commonly used protocols it contains).

Components at a given layer within a protocol suite may form a functional class or group, such that a particular component from each group may be selected to create a complete protocol stack designed to achieve the overall information transfer objectives for a specific need. For example, a protocol stack may consist of Hypertext Transfer Protocol (HTTP) stacked on Transmission Control Protocol (TCP) stacked on Internet Protocol (IP) stacked on Ethernet, and such a stack may serve to reliably transmit web pages from one computer to another within a local area network (LAN) environment. Alternatively, a protocol stack that includes Voice over IP (VoIP) on top of User Datagram Protocol (UDP) on top of Internet Protocol (IP) on top of Ethernet may be used for intra-office telephone communication.

Many types of communication protocols are known, and may be classified in any number of ways, including the media over which they function (copper wire, fiber-optic cable, wireless, and so on), the responsibilities they manage (error correction, flow control, routing, sequencing, and so on), the data types they carry (voice, video, text, and so on), the protocol suite they belong to (X.25, TCP/IP, and so on), the network layer or layers to which they correspond, and/or their popularity of use, to name a few.

SUMMARY

According to an aspect of the present invention, there is a computer-implemented method, computer program product and/or computer system that performs the following operations (not necessarily in the following order): (i) determining a plurality of Protocol Complexity Indicator (PCI) values respectively corresponding to a plurality of network data communication protocols, with each PCI value of the plurality of PCI values reflecting relative network usage bandwidth for a given amount of network traffic under the respectively corresponding data communication protocol; (ii) creating a PCI mapping data set mapping the plurality of data communication protocols to their respectively corresponding PCI values; (iii) receiving a predicted network traffic volume data set including information indicative of an expected total amount of network traffic and expected volume of network traffic under each protocol of the plurality of data communication protocols; and (iv) determining an amount of network bandwidth needed to handle the total amount of expected network traffic at a given speed based, at least in part, upon the expected network traffic under each protocol of the plurality of data communication protocols and the respectively corresponding PCI values of the PCI mapping table.

BRIEF DESCRIPTION OF THE DRAWINGS

FIG. 10 is a flowchart showing a third embodiment method performed, at least in part, by the fourth embodiment system;

FIG. 11 is a diagram depicting derivation of a threshold list in the fourth embodiment system.

DETAILED DESCRIPTION

Figure 1:
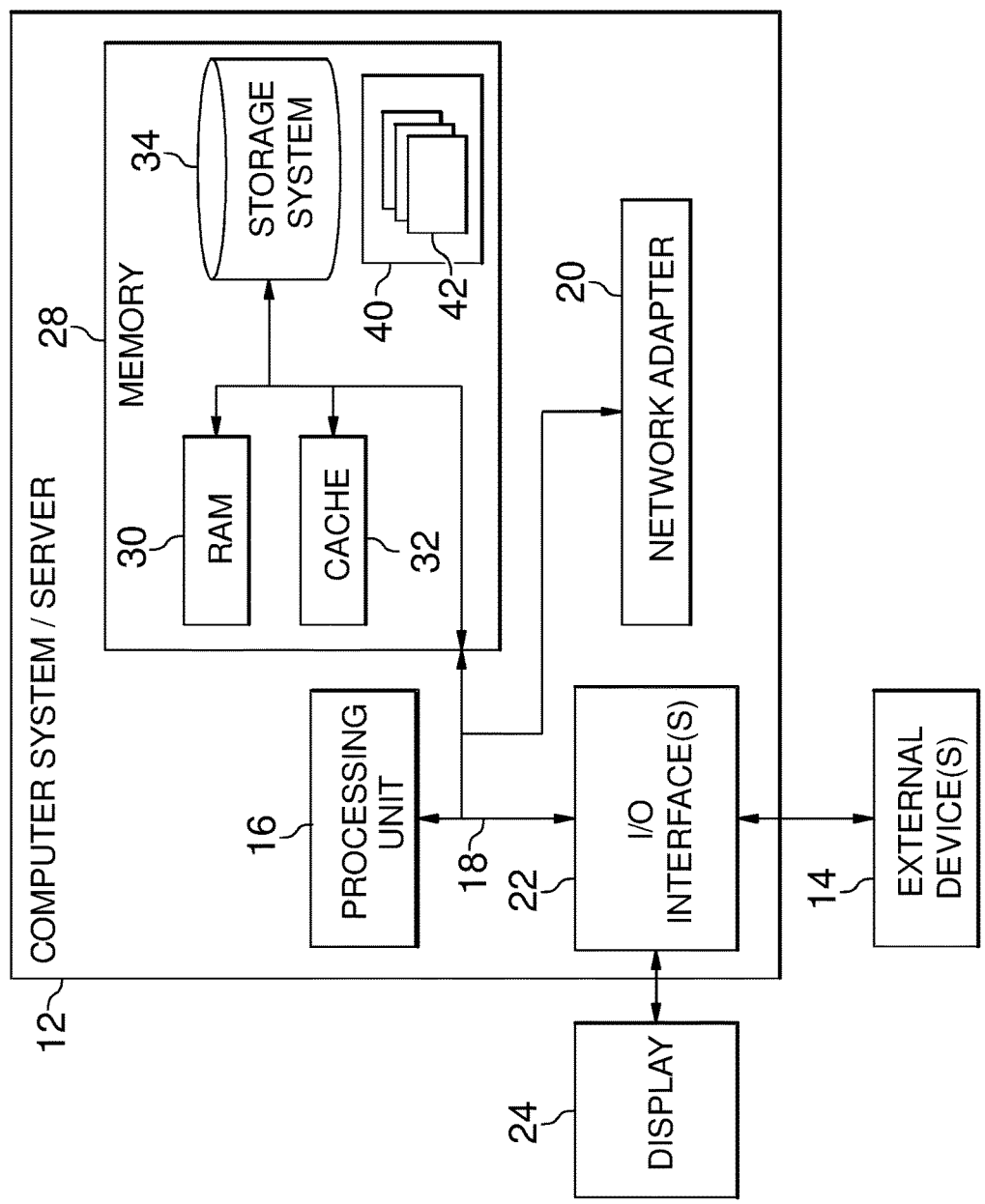
FIG. 1 depicts a cloud computing node used in a first embodiment of a system according to the present invention.

Some embodiments of the present invention compute and maintain a protocol complexity indicator (PCI) for each protocol of interest in a traffic inspection system. The PCI provides an indication of the level of system throughput that can be sustained for a given quantity of traffic of that protocol. The system then uses the PCI to determine when to spawn a new instance of a network analyzer component for that protocol to maintain throughput at or above a specified level. Network analyzer components may be similarly deallocated to optimize resource utilization.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
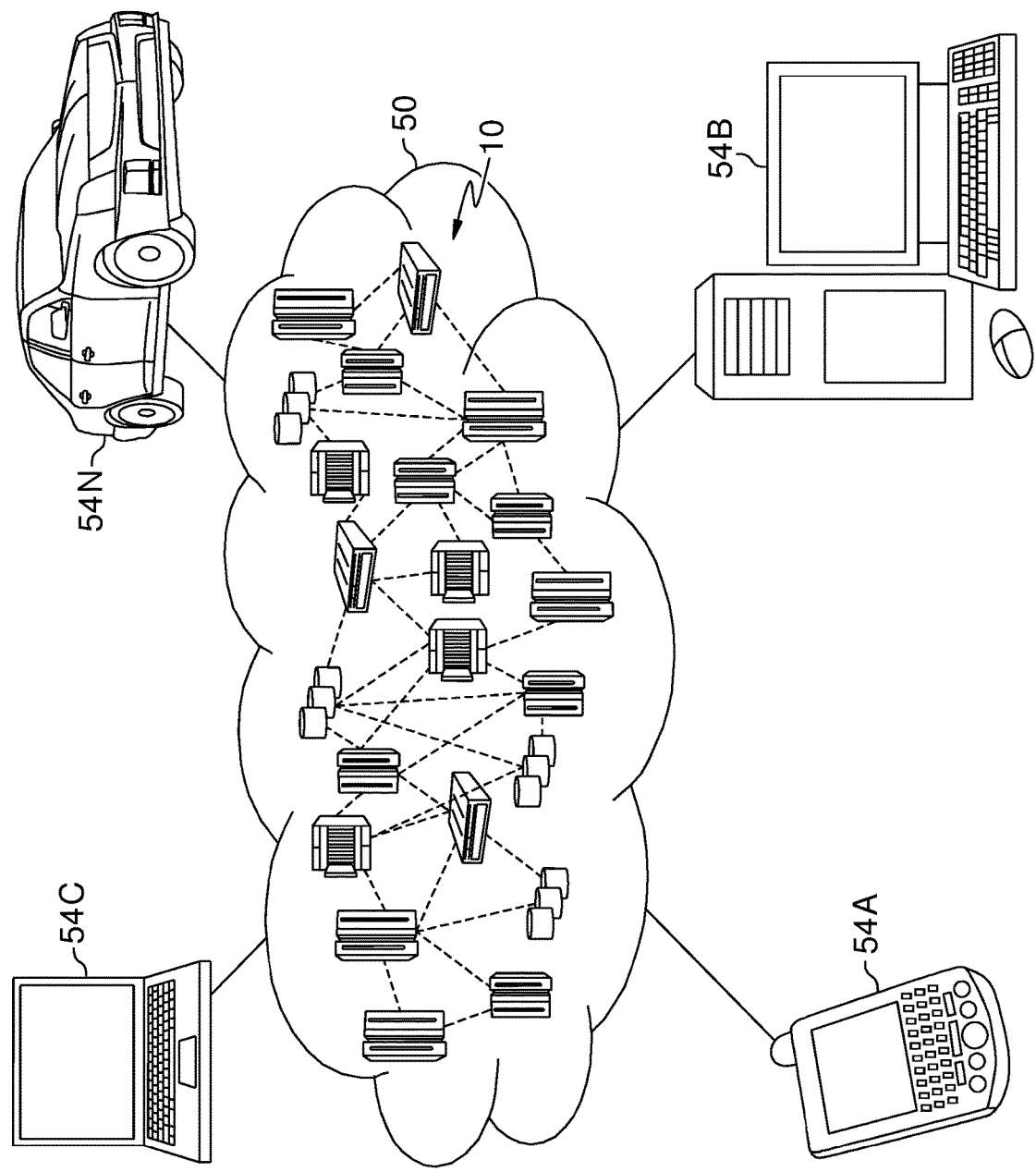
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
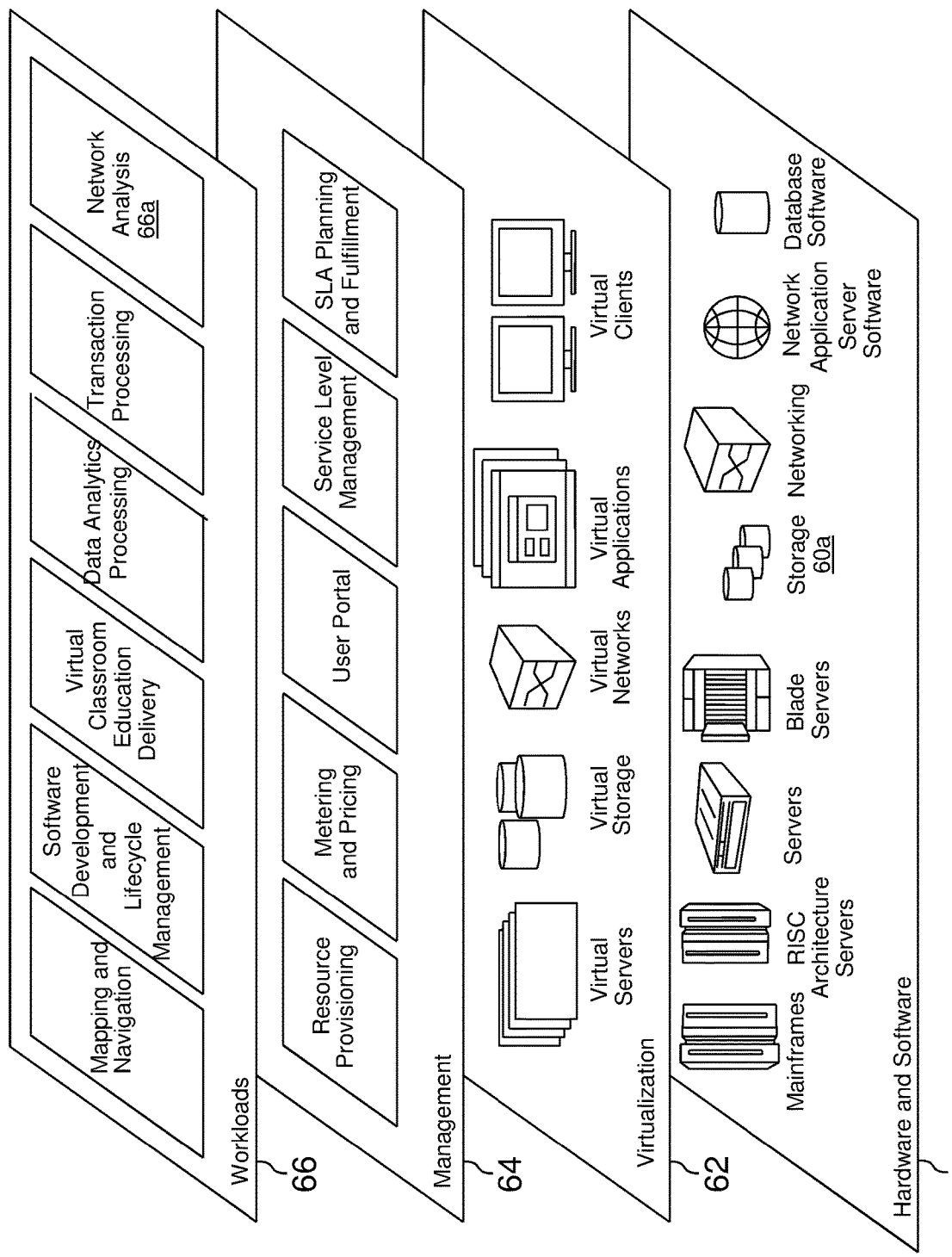
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Some embodiments of the present invention recognize that the processing resources required for a particular quantity of traffic may vary by protocol because protocols vary in complexity. Some of the complexity differences may be fixed (for example, because the header format for a particular protocol has, say 32 unique fields while another protocol has a header with only 3 fields), while some of the complexity differences may also vary over time (because, for example, a greater proportion of packets received of a given protocol offering optional encryption or error correction have that mode enabled during a certain period of time).

Figure 4:
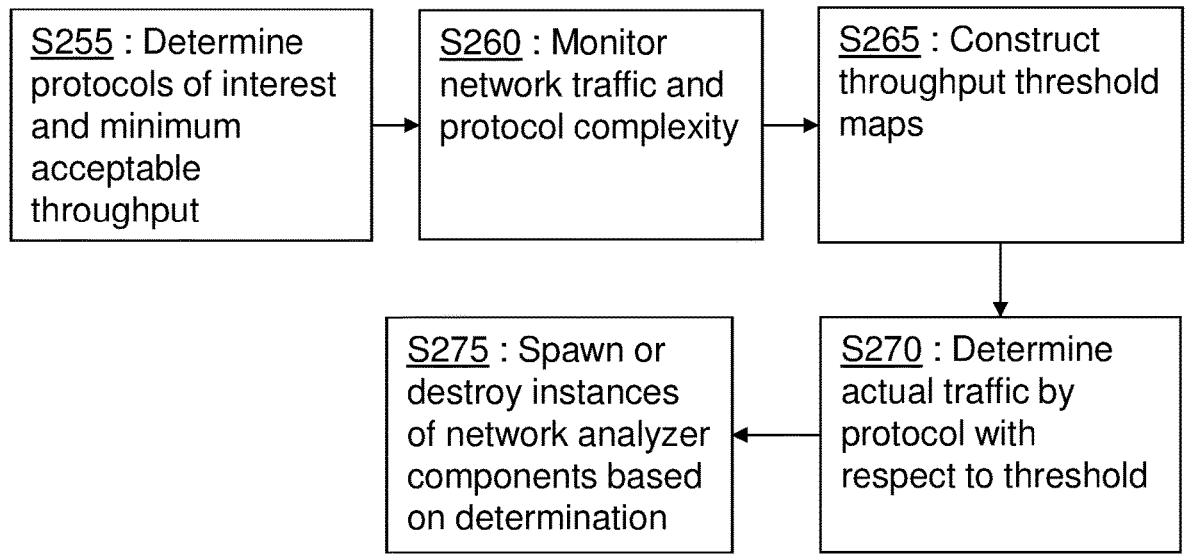
FIG. 4 is a flowchart showing a first embodiment method performed, at least in part, by the first embodiment system.
Figure 5:
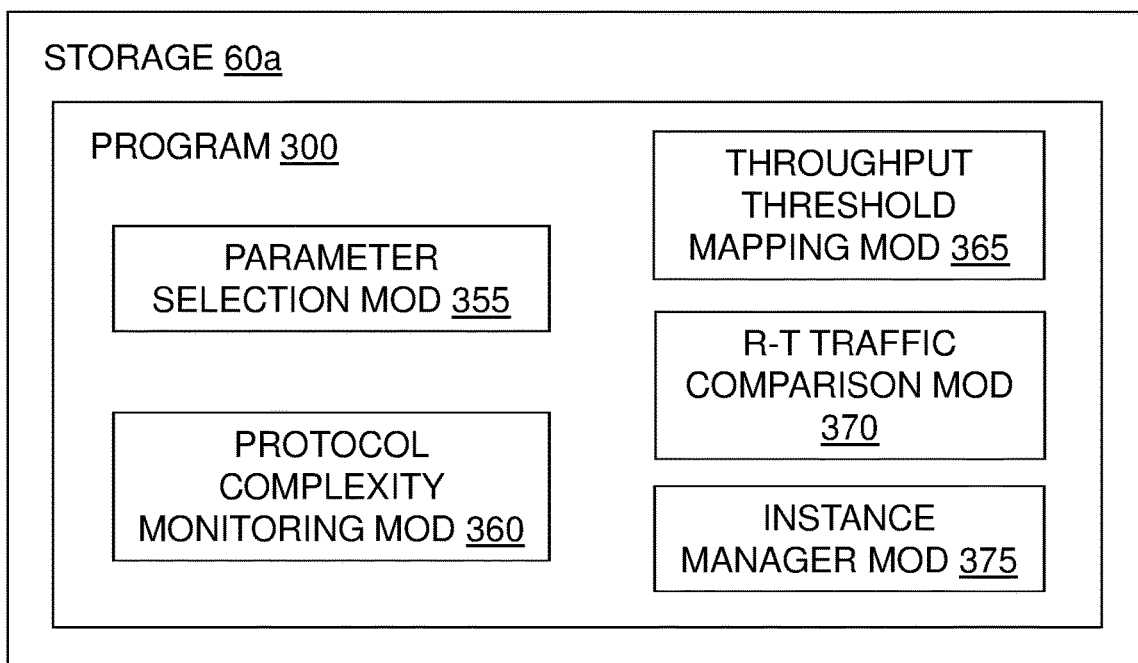
FIG. 5 is a block diagram showing a machine logic (for example, software) portion of the first embodiment system.

FIG. 4 shows flowchart 250 depicting a method according to the present invention. FIG. 5 shows program 300 for performing at least some of the method operations of flowchart 250. This method and associated processing modules will now be discussed, over the course of the following paragraphs, with extensive reference to FIG. 4 (for the method operation blocks) and FIG. 5 (for the processing modules). One physical location where program 300 of FIG. 5 may be stored is in storage block 60a (see FIG. 3). Note also that examples are for illustration purposes only and may not correspond to realistic scenarios in every respect.

Processing begins at operation S255, where parameter selection module ("mod") 355 accepts initial parameters for network traffic monitoring and inspection system operation. These parameters include a user-specified minimum acceptable system throughput (actually throughput capacity—throughput as long as total traffic demand is sufficient to meet or exceed this value) as well as a list of protocols selected for monitoring and response actions in accordance with the process presently described, which can be updated over time as desired by the user. Alternatively, one or both of these parameters could be determined automatically by the system. For example, minimum acceptable throughput could be adjusted based on an analysis of user facial expressions or user feedback solicited in real-time as system response times increase under higher traffic loads, or on a risk analysis of the current threat environment as inspection percentages decline under such loads, while the protocols of interest might be determined by a dynamic evaluation of which protocols consume the greatest number of inspection resources per packet or have the greatest variability in their complexity levels. Similarly, other parameters, such as minimum acceptable throughput by protocol or maximum acceptable idle resources, might be collected instead or in addition to those mentioned above. Here, a user specifies a minimum acceptable throughput of 6 Gbps and a desire to monitor HyperText Transfer Protocol (HTTP) and Transport Layer Security (TLS) traffic.

Processing proceeds to operation S260, where protocol complexity monitoring mod 360 monitors the protocols specified in the previous operation for their complexities. By protocol complexity, it is meant the amount of resources required to process a unit of traffic of the given type, or, stated another way, the bandwidth used to process a unit of traffic of the given type. For some protocols, this value may vary significantly over time. In this case, HTTP and TLS traffic metrics such as number of packets, average packet size, and average time to inspect are compiled repeatedly for each of these two traffic types over sampling periods of 1 second. Other metrics may be collected and/or computed alternatively or in addition to these, including total traffic volume, composition of total network traffic by protocol, trends, and so on. Such metrics may be obtained using conventionally known techniques. Continuing with the example, a particular sample here reveals volumes of 3456 packets for HTTP and 1234 packets for TLS, with average processing times of 0.13 and 0.56 milliseconds, respectively, in the context of total traffic volume of 8 Gbps. This corresponds to average inspection rates of about 27 Mbps for HTTP and about 2 Mbps for TLS over the sample time period.

Processing proceeds to operation S265, where throughput threshold mapping mod 365 uses the gathered information to establish a set of thresholds for traffic of each protocol of interest. In this embodiment, the gathered data is used to map percentage of total inspected traffic of each protocol of interest to an estimated total inspected network throughput (thereby predicting the bandwidth usage by each protocol), and from this to set thresholds beyond which additional resources should be deployed (or withdrawn) in order to avoid dropping below the user-specified throughput minimum (or pointlessly tying up resources). For example, according to the example map of FIG. 12B (discussed further in section III of this Detailed Description), for outbound SSL traffic, if the goal is to secure at least 1 Gbps throughput, a threshold will be set at about 50% such that when the inspection rate percentage reaches that threshold, the system will spawn a new inspection process for this traffic type.

To return to the example above, the system determines, for at least the 6 Gbps desired minimum secured throughput volume discussed earlier, the maximum percentage of HTTP traffic and TLS traffic that can support that throughput level based on the complexities of each of these protocols. In this case, the system determines these values are 80% and 25%, respectively. In some embodiments, the percentage values may be determined for a wide range of overall throughput volumes (such as in the examples of FIGS. 12A-C), and mappings may be determined through any combination of real-time system status and traffic monitoring, empirical data gathered in advance, theoretical modeling and simulation, and/or other techniques. Percentage values may, of course, vary depending not only on the complexity of a given protocol, but on the amount of resources currently allocated to processing that protocol, among other factors.

Processing proceeds to operation S270, where real-time traffic comparison mod 370 compares actual traffic percentages of each protocol of interest against the threshold(s) determined in the previous operation. There will typically be an inverse relationship (whether linear or non-linear) between percentage of total inspected traffic a protocol of interest represents and overall throughput. In such a scenario, if the percentage meets or exceeds the deployment threshold, the system recognizes that its ability to meet the minimum acceptable throughput established in operation S255 may be compromised. It thus instructs instance manager mod 375 to instantiate additional network analyzer components for processing packets of the given type, effectively increasing its capacity to meet or exceed the desired throughput level. Similarly, if the percentage of total inspected traffic of the protocol of interest falls below the withdrawal threshold, the system recognizes that its resource allocation for the protocol may be overly conservative and instructs instance manager mod 375 to deallocate one or more of the allocated components.

Processing proceeds to operation S275, where instance manager mod 375 allocates or deallocates network analyzer components in accordance with the determination of the previous operation.

Note that changing conditions, such as protocol complexity, relative traffic composition, and changes to the quantities of resources allocated to a particular protocol per the process described above, may affect the map and the computed thresholds. As such, operations S260 through S275 are repeated continuously, periodically, or on an event-driven basis to ensure the system is meeting performance requirements, using resources efficiently, and responding appropriately to dynamic conditions. Use of the technique described herein may be used independently or in conjunction with other techniques designed to maintain a minimum level of throughput—for example, decreasing the percentage of traffic subject to inspection when traffic loads are high.

Some embodiments of the present invention, recognizing that benefits of performing the above-described method may vary relative to costs based on the characteristics of the protocols being analyzed and the flexibility of the analysis environment, perform the above-described method only for some subset of all possible protocols that may be encountered in an operating environment, such as: (i) protocols of the TCP/IP protocol suite; (ii) protocols at and/or above the internet/global routing layer; (iii) protocols that are relatively common; (iv) protocols that are relatively complex; (v) protocols whose complexities have a relatively large degree of real-time variability; (vi) protocols of a group (such as a layer) where the group contains a large number of different protocols) in use or expected to be in use in an environment; (vii) protocols of a group (such as a layer) where the group contains protocols with significant differentials in complexities in use or expected to be in use in an environment; and/or (viii) sets of protocols grouped together (for example, performing the method for TCP and UDP jointly as if they were a single protocol).

III. Further Comments and/or Embodiments

Some embodiments of the present invention recognize: (i) that as enterprises and organizations move data infrastructure from traditional network environments to cloud-based environments, they may also benefit from moving network security appliances from traditional network environments to cloud-based environments in order to maintain the same level of security; (ii) that traditional network security solutions consist of combinations of multiple independent security appliances such as firewalls, intrusion detection systems (IDSs), and intrusion prevention systems (IPSs), which may generate a lot of resource and performance overheads when applied to a cloud environment that is distributed and dynamically changing; (iii) that simply moving physical network security appliances from traditional network environments to cloud-based environments can be inefficient and can introduce resource redundancy; and/or (iv) that on security appliances, whether physical or virtual, a burst of traffic or a high ratio of specific packets or packet types can introduce additional overhead for deep inspection and reduce protection capacity.

Further, some embodiments of the present invention recognize: (i) that migrating traditional physical appliances such as IDSs/IPSs into a large cloud environment may be done via virtualized deployment, which may be an excellent way to make physical appliances reach the scalability required in the cloud; (ii) that virtual appliance deployments may nevertheless still have overheads of traditional hardware appliances; and/or (iii) that such overheads may be reduced by breaking down inner components of such appliances into individual virtual components.

Some embodiments of the present invention may therefore include one, or more, of the following features, characteristics and/or advantages: (i) a flexible network analyzer in a large-scale deployment; (ii) a system that can fully manage individual virtual security appliance (such as IPS or IDS) components in a cloud environment while introducing minimal overheads; (iii) efficiently distribute network traffic flows to the cloud via a virtual server/load balancer (such as a highly scalable and highly available server built on a cluster of real servers, with a load balancer and a server cluster architecture such that users interact as if it were a single high-performance virtual server) then funnel them through security appliance components; and/or (iv) route flows first through a protocol identifier to determine the traffic type and then through an inspector to check for potential threats, with any events or incidents found passed to an event handler which can then be used in accordance with security policies to initiate actions in response to the possible threats.

To make traffic identification and inspection more efficient, in some embodiments of the present invention identifier components are further broken down by specialization and arranged in layers aligned with network protocol layers. Each identifier only handles one specific protocol (such as POP3, SMTP, and so on). The advantage of this implementation is that the identifier deployments can be dynamically adjusted in response to the content of the network traffic. For example, if the system detects a certain increase of HTTP traffic it can spawn more HTTP protocol identifiers to handle the traffic increase and make the whole system more efficiently in processing HTTP traffic.

Some embodiments of the present invention may therefore include one, or more, of the following features, characteristics and/or advantages: (i) deploy a scalable IPS/IDS solution in a cloud environment that can dynamically adjust its components to more efficiently process network traffic in response to ever-changing network contents; (ii) break down essential security appliance components by specialization; (iii) arrange identifier components aligned with network protocol analysis tree layers; (iv) dynamically spawn/destroy identifier components in response to network traffic content in real time; (v) provide a way of analyzing packets with flexible resource allocation, helping to avoid interference due to resource limits and helping to continue serviceability by on-demand protection capacity; (vi) provide a highly scalable solution that can be run directly from the same cloud platform(s) as the service(s) it protects; (vii) greatly cut down resource overhead by adjusting the resources consumed in response to network traffic; (viii) avoids the difficulty faced by traditional physical appliance solution of determining how many appliances are needed in light of unpredictable network traffic; (ix) leverage high availability system characteristics when adapted to a cloud service that employs high availability hardware, such that no redundant hardware purchase is required; and/or (x) are highly customizable, being component based, so administrators can adopt components that are relevant to their own cloud infrastructure and business needs.

Figure 6A:
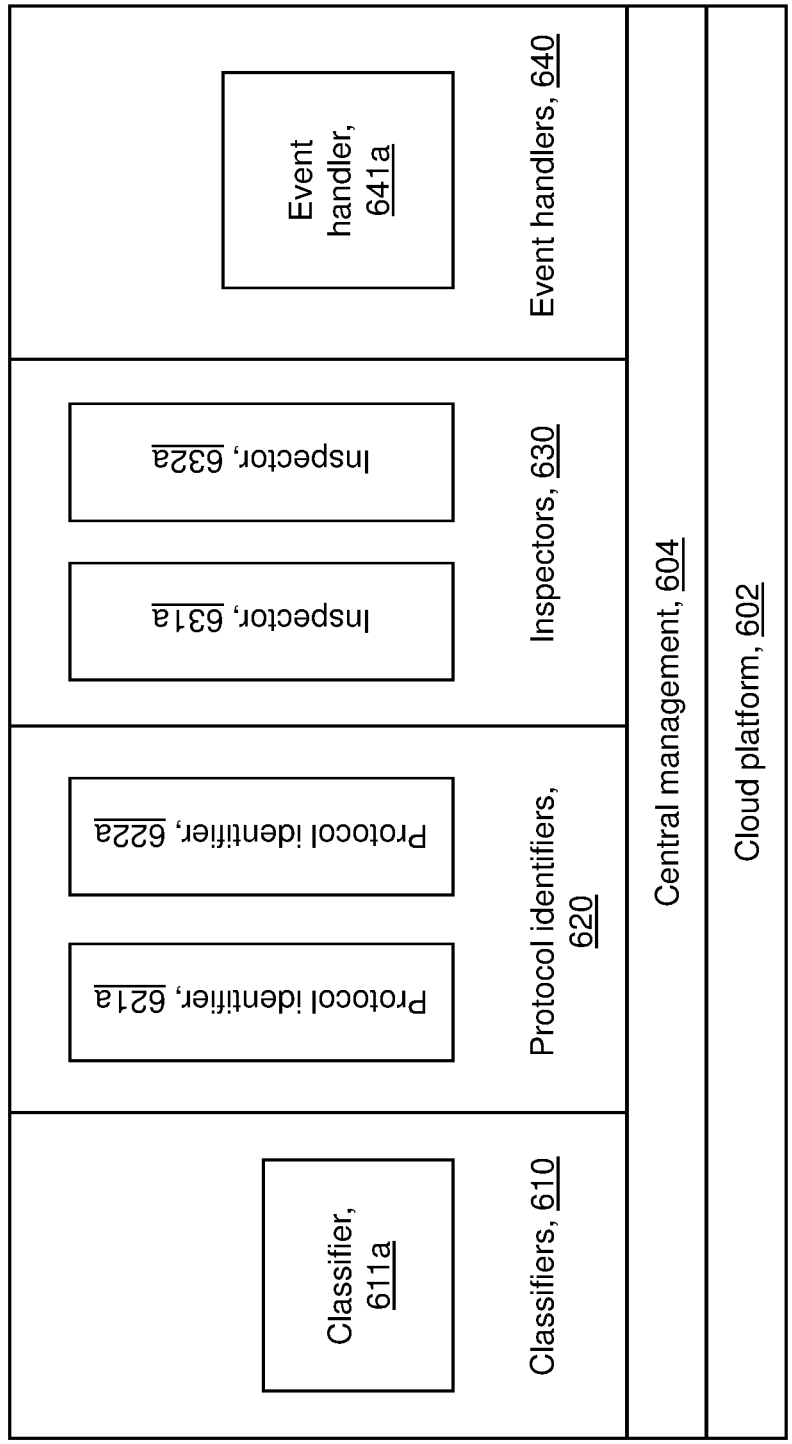
FIG. 6A is a block diagram showing logical architecture of a second embodiment system according to the present invention.

Shown in FIG. 6A is system 600, a cloud-based network analyzer system embodiment according to the present invention. System 600 includes: cloud platform 602; central management layer 604; classifiers 610, including classifier 611a; protocol identifiers 620, including protocol identifiers 621a and 622a; inspectors 630, including inspectors 631a and 632a; and event handlers 640, including event handler 641a. Classifiers 610 take the place of traditional load balancers that receive network traffic passed by a firewall and distribute it to any of various security appliances. The network traffic is classified and directed to different security appliance components according to the traffic's properties, threat level, pre-set policies, and so on, and, after analysis by the security system, traffic accepted for further processing is then forwarded on to the appropriate application servers or other service components. In this embodiment, traditional security appliances are replaced by small modules that are deployed to the cloud as virtual appliances, with each appliance focusing on different levels of packet data. Resource consumption for decrypting packet data of the same level is reduced.

Figure 6B:
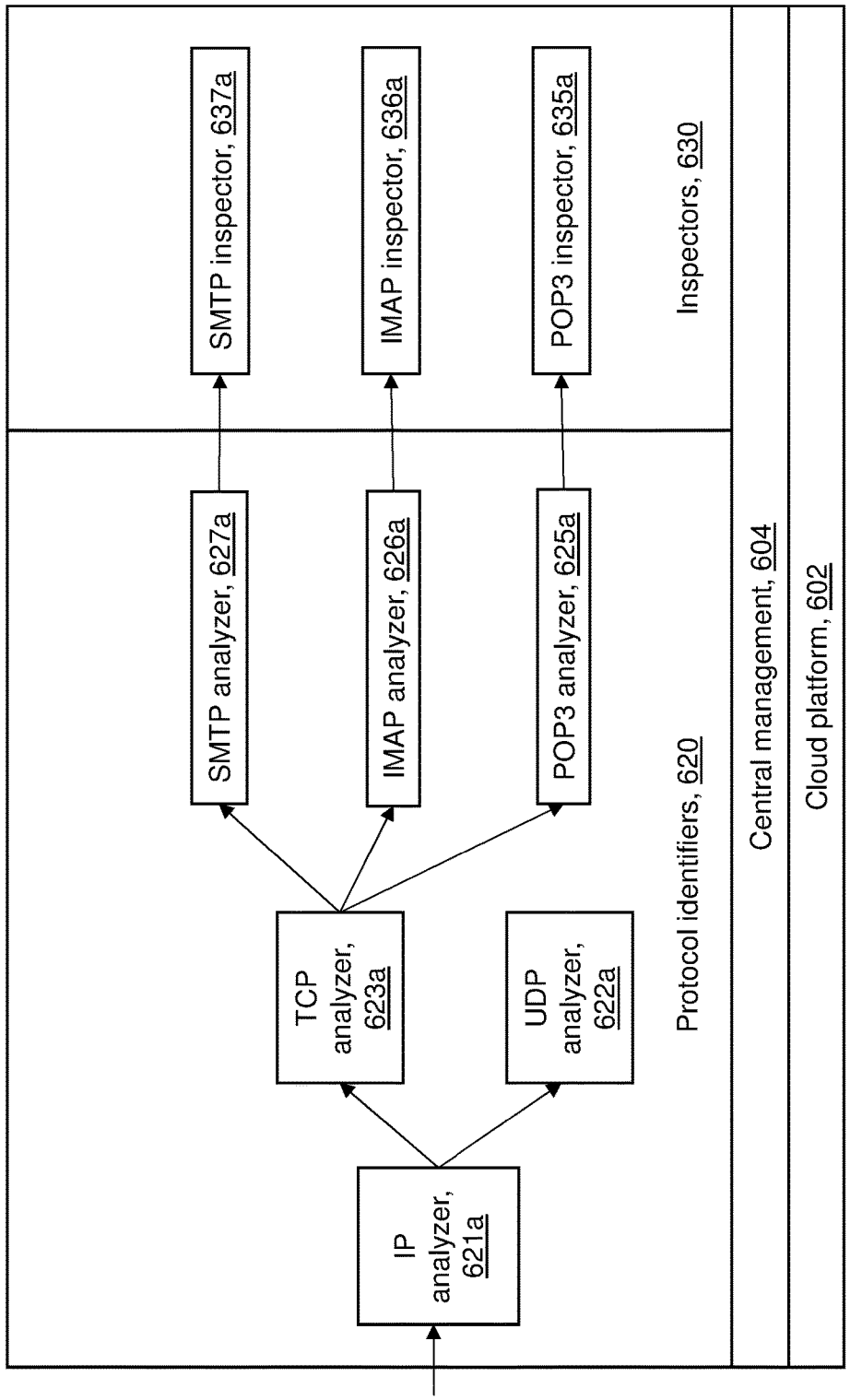
FIG. 6B is a block diagram showing data flow for Internet Protocol (IP) traffic in the second embodiment system.

Shown in FIG. 6B is another illustration of system 600, depicting in greater detail the system's identifier and inspector components and how network traffic is moved through them. This detailed view includes: protocol identifiers 620, including Internet Protocol (IP) analyzer 621a, User Datagram Protocol (UDP) analyzer 622a, Transmission Control Protocol (TCP) analyzer 623a, Post Office Protocol version 3 (POP3) analyzer 625a, Internet Message Access Protocol (IMAP) analyzer 626a, and Simple Mail Transfer Protocol (SMTP) analyzer 627a; and inspectors 630, including POP3 inspector 635a, IMAP inspector 636a, and SMTP inspector 637a. System structure and traffic movement is based on an analyzer tree model, wherein a given packet of data is forwarded to an appropriate first node, and, if analyzed successfully, is forwarded on to a second appropriate node based on that analysis (alternatively, if the first node fails to successfully analyze the data, the packet is discarded). For instance, suppose a packet of data based on the IMAP protocol arrives at system 600. The packet will be forwarded first to IP analyzer 621a to analyze the packet at the IP layer, then on to TCP analyzer 623a to analyze the IP payload at the TCP layer, then on to IMAP analyzer 626a to analyze the TCP payload at the IMAP layer, and finally on to IMAP inspector 636a to inspect the contents of the IMAP packet payload.

Figure 6C:
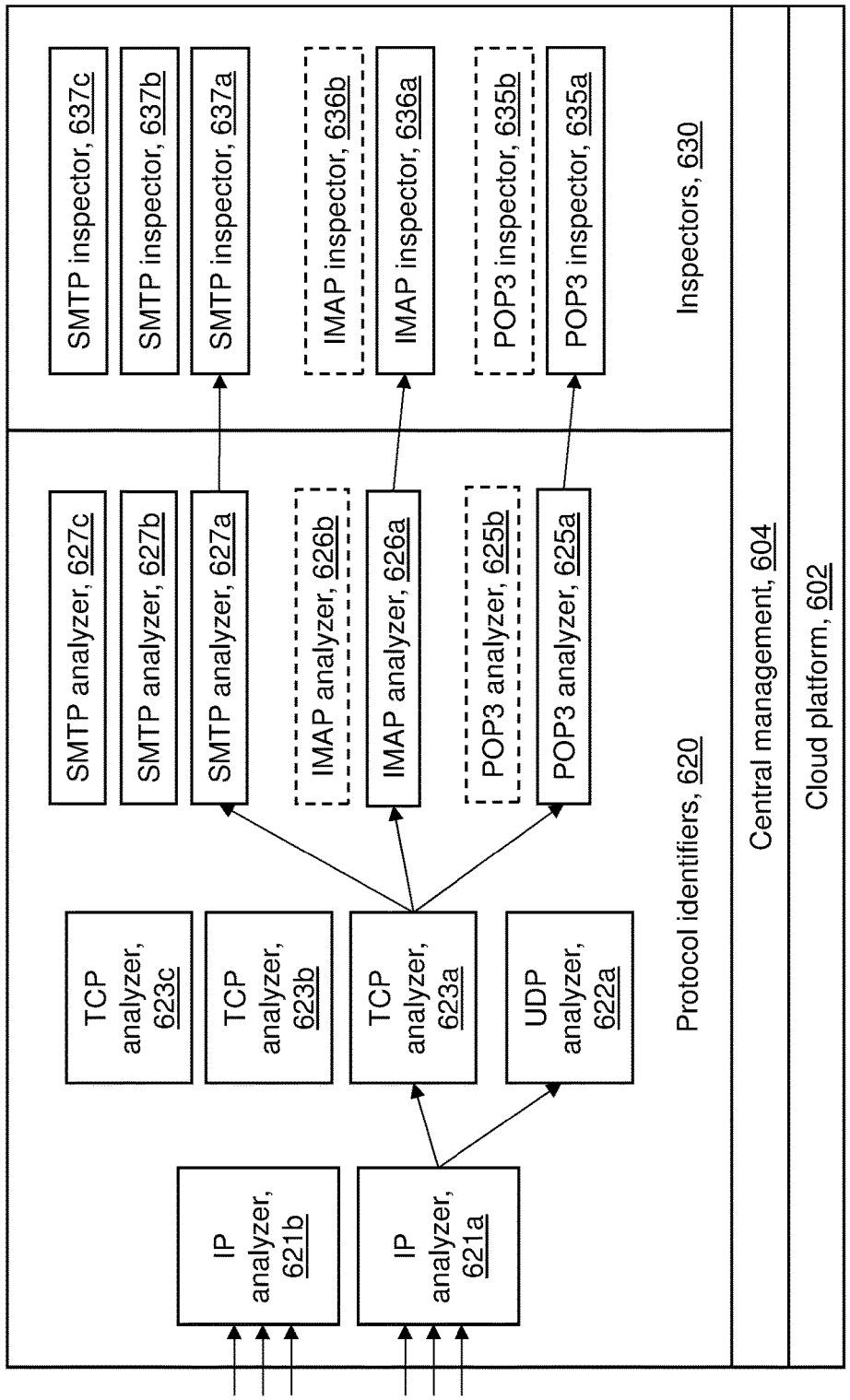
FIG. 6C is a block diagram illustrating dynamic modules for processing Internet Protocol (IP) traffic in the second embodiment system.

Shown in FIG. 6C is another illustration of system 600, depicting how identifier and inspector components are dynamically created and destroyed according to incoming traffic type and load. This detailed view adds IP analyzer 621b, TCP analyzers 623b and 623c, POP3 analyzer 625b, IMAP analyzer 626b, SMTP analyzers 627b and 627c; POP3 inspector 635b, IMAP inspector 636b, and SMTP inspectors 637b and 637c. At the point in time depicted here, IP traffic load has increased, relative to some previous point in time, such that two IP analyzer modules have been dynamically created, along with three TCP analyzer modules, three SMTP analyzer modules, and three SMTP inspectors. At the same time, IMAP and POP3 traffic has decreased, so some of the modules dealing with that type of traffic (namely, 625b, 626b, 635b, and 636b) have been dynamically destroyed.

Figure 6D:
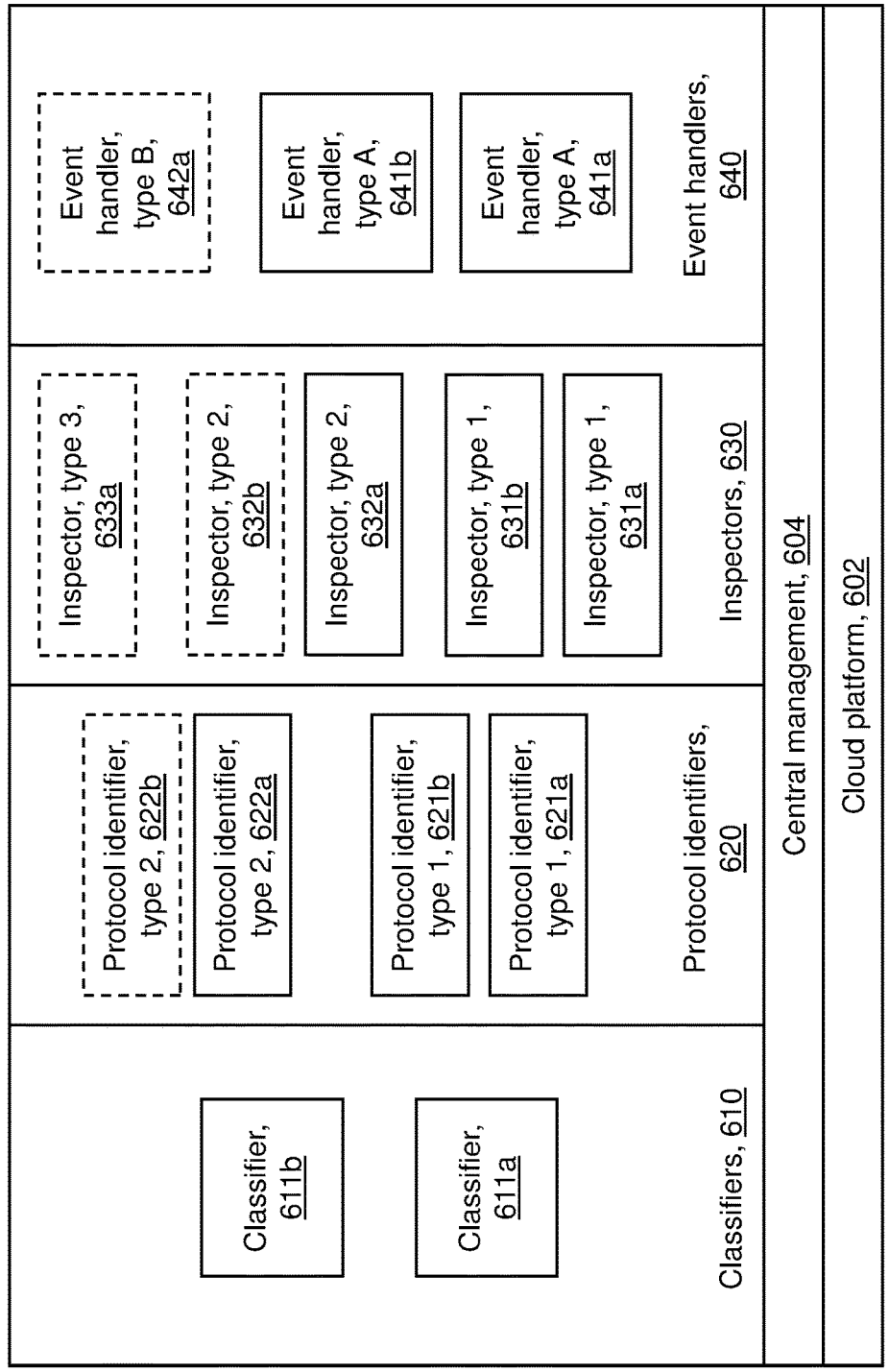
FIG. 6D is a block diagram showing logical architecture for dynamic modules in the second embodiment system.

Shown in FIG. 6D is another illustration of system 600, depicting dynamic creation and destruction of modules in the more complete context of classifiers 610, identifiers 620, inspectors 630, and event handlers 640. For these component types, FIG. 6D shows: classifiers 611a and 611b; protocol identifiers (type 1) 621a and 621b, and protocol identifiers (type 2) 622a and 622b; inspectors (type 1) 631a and 631b, inspectors (type 2) 632a and 632b, and inspector (type 3) 633a; and event handlers (type A) 641a and 641b, and event handler (type B) 642a. When any of the inspection components report events such as threat traffic being blocked, logged, or quarantined, the events are passed to the appropriate event handling components. These event components then take various actions according to policy settings. For example, they may send new firewall policies to the firewall appliance (physical and/or virtual) if certain traffic needs to be blocked or reformat event data before repopulating it to an event log database or threat intelligence analyzer for event correlation. Like other components of system 600, the number and type of event handling components 630 are also adjusted dynamically according to demand.

Figure 7:
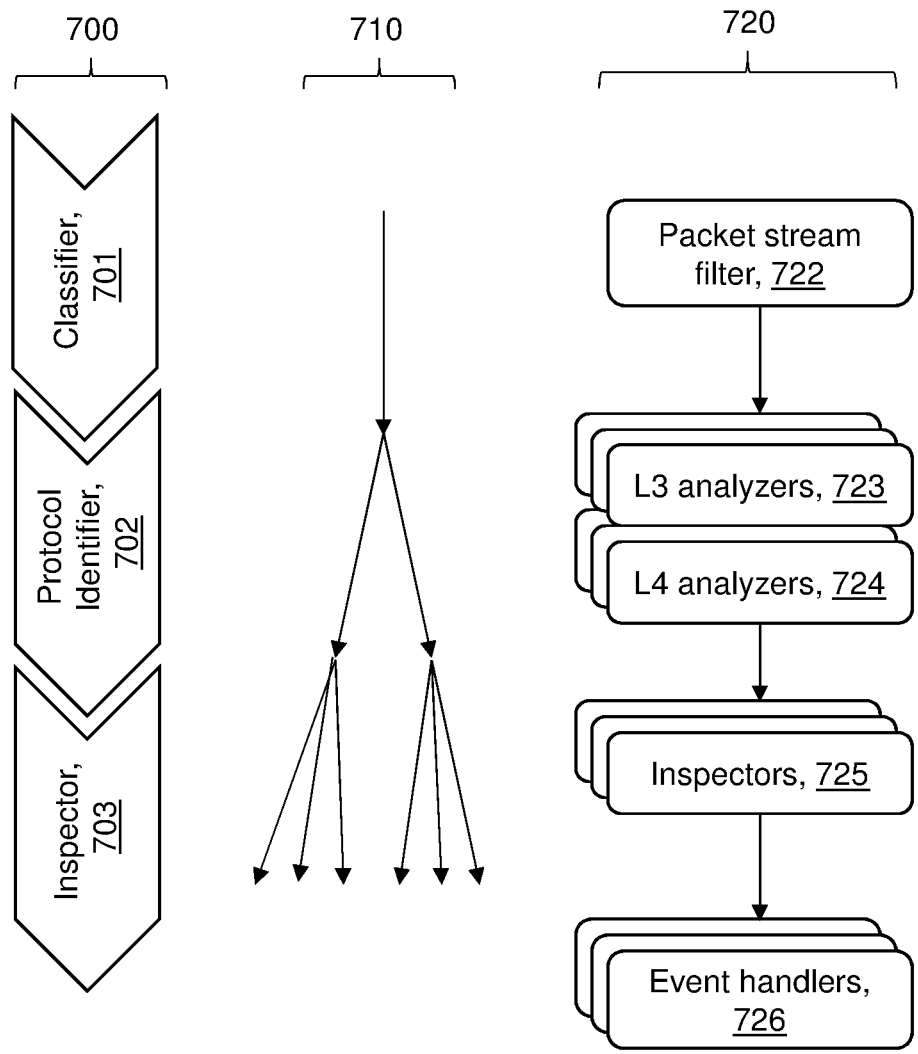
FIG. 7 is a set of flow diagrams illustrating various aspects of data flow in a third embodiment system according to the present invention.

Shown in FIG. 7 is a summary of the network data security analysis process employed in some embodiments of the present invention. Graphic 700 shows data movement from classifier stage 701 to protocol identifier stage 702 to inspector stage 703. Graphic 710 illustrates the typical scenario where, at each of the three stages depicted in graphic 700, the number of allocated components is generally greater than or equal to the number of allocated components for the previous stage, though this need not necessarily be the case. Graphic 720 shows packets moving from packet stream filter(s) 722 to network layer 3 and layer 4 analyzers 723 and 724, respectively, to inspectors 725 and finally to event handlers 726. At the packet stream filter (classifier stage), a determination is made as to whether traffic needs to be checked for security and if so which security component should perform that check. At the protocol identifier stage, different categories of network traffic are routed to and analyzed by different analyzers (possibly more than one as a packet is unwrapped, protocol layer by protocol layer). Different analyzers will then redirect each packet to appropriate corresponding inspectors at the inspector stage. Whenever any events occur, event handlers will then perform appropriate follow-up actions, such as sending instructions to a firewall to block the offending traffic source, contacting the classifier to alter the traffic route, or logging the event to an event log database.

Some embodiments of the present invention may include one, or more, of the following features, characteristics and/or advantages: (i) dynamically adjust module resources based on packet I/O levels; (ii) employ virtual machines (VMs) and/or individual processes/daemons for each module; (iii) base calculations as to the number, type, and implementation of modules on specific packet type volumes and contents; (iv) dynamically adjust module resources so as to fully analyze specific packet categories; (v) provide an optimized component resource allocation via dynamic plus predefined traffic analysis; (vi) dynamically and accurately allocate system resources by analyzing network traffic protocol composition such as network traffic type, shape, and so on; (vii) focus on network services; (viii) guarantee complete network protection with respect to target traffic while maintaining a particular performance level; (ix) provide network protection and/or security services; and/or (x) provide complete network protection without bypassing (or dropping) any traffic that is supposed to be inspected (or passed).

Some embodiments of the present invention recognize the following facts, potential problems and/or potential areas for improvement with respect to the current state of the art: (i) as enterprises and organizations move their infrastructure from traditional network environments to cloud, traditional network security infrastructure also needs to move to a cloud-based environment; (ii) cloud network traffic usually consists of multiple protocols with complexities that can vary substantially; (iii) such traffic characteristics make predicting and maintaining a desired level of network throughput very difficult, particularly when the traffic is subjected to security inspections—for example, inspecting a typical HTTPS session can consume 4 to 8 times more resources as compared to inspecting a typical HTTP session, making the prediction and maintenance of network throughput in the cloud quite difficult; and/or (iv) at the same time, it is often essential to many enterprises to maintain a level of satisfactory network throughput for their online assets and infrastructure.

Further, some embodiments of the present invention recognize: (i) that simply moving physical network security appliances from the traditional network environment to a cloud-based environment is ineffective for dealing with the large scale of network traffic, the composition of which constantly varies—for example, if network traffic supporting HTTPS sessions increases from 20% to 40%, throughput may drop significantly even when the total volume of network traffic has not changed; (ii) that simply deploying a lot of redundant infrastructure is not a cost effective solution; and/or (iii) that what is needed is a solution that deals with cloud resource management for security infrastructure, and not only at a generic load level, but also based on the contents of the traffic.

Still further, some embodiments of the present invention recognize: (i) that in order to inspect all the packets that pass through a traditional IPS/IDS (even in a cloud environment), the core engine of the appliance should handle all protocols; (ii) however, each protocol has a different resource cost depending on factors such as its header length and the complexity of its construction; (iii) that, as a result, when the appliance spends more resources on one specific complex protocol, the total inspected bandwidth decreases, and other traffic is impacted; and/or (iv) a system can nevertheless avoid such bandwidth impact from peak resource usage by complex protocol analysis, and can thereby keep throughput at an acceptable value.

Some embodiments of the present invention therefore compute a Protocol Complexity Indicator (PCI), which may in some embodiments take the form of an automatically generated chart, graph, table, or formula. The PCI is used to predict bandwidth usage by each protocol and in turn determine when to provide extra resources to handle a specific protocol. As traffic moves through the system, concurrent bandwidth is counted by protocol. The system monitors the PCI to determine if a specific protocol has reached a threshold that is calculated according to the minimum acceptable throughput. This throughput is throughput through the inspection engine, and may be, for example, an overall or a relative value, and/or an absolute number. To avoid the throughput dropping below this value, the system forks a new instance of the overburdened network analyzer component (for example, protocol identifier, inspector, event handler, and so forth) to handle the specific protocol of concern and maximize the utilization of allocated resources.

Some embodiments of the present invention: (i) automatically generate a threshold list for different protocols based on the PCI (which may in some embodiments take the form of an automatically generated interesting protocol throughput line graph); and/or (ii) spawn a new instance of one or more network analyzer components to handle any protocol that overuses the resources allocated to it to keep the throughput at or above some desired minimum value.

Some embodiments of the present invention: (i) apply pre-generated or auto-generated performance charts to determine the most resource-efficient time to spawn a new instance in order to maintain a defined minimum bandwidth; and/or (ii) measure and calculate protocol throughput when network traffic goes through the system, and periodically update the PCI based on this protocol throughput through the system (for example, every 5 minutes).

Figure 8:
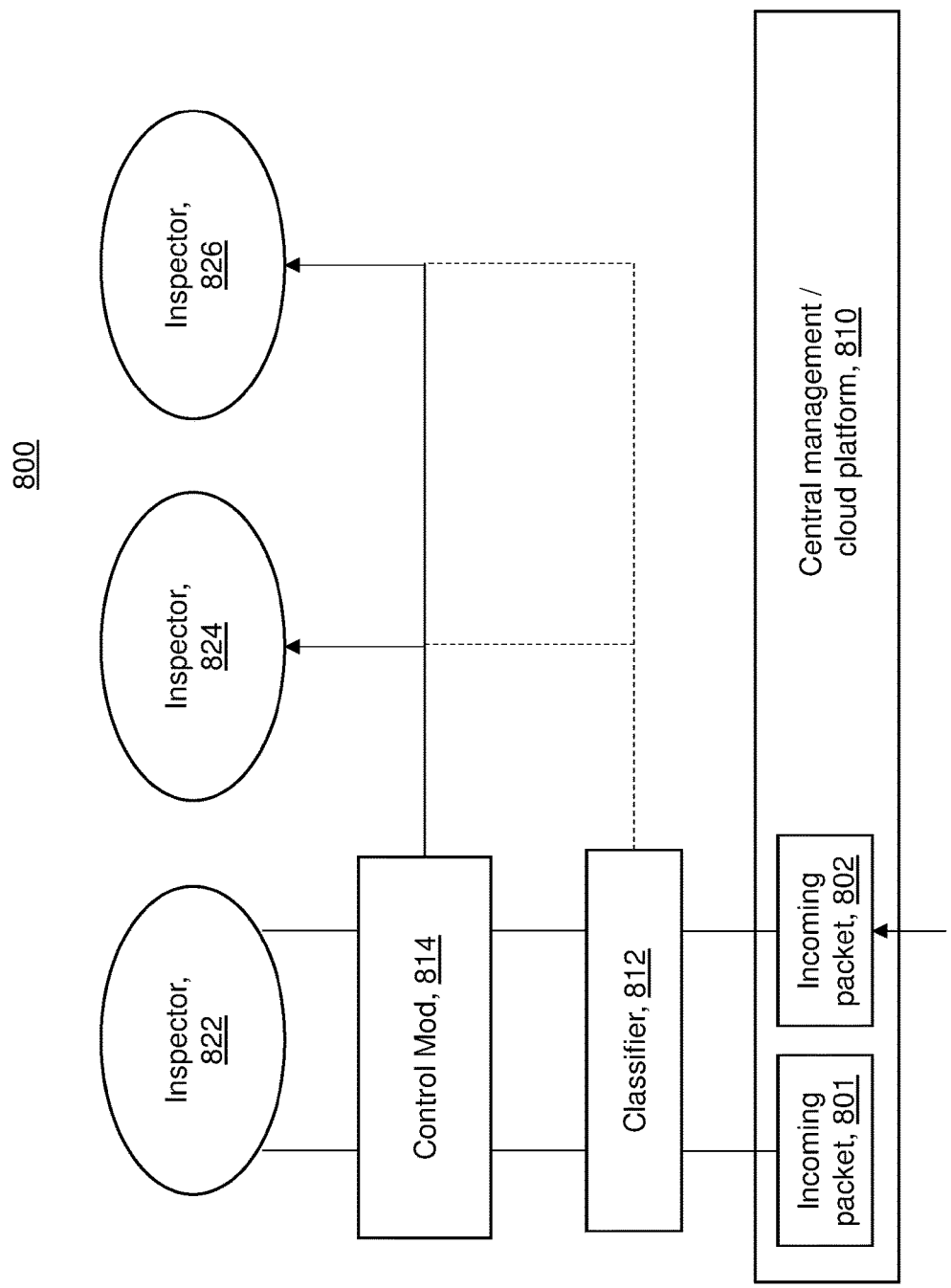
FIG. 8 is a block diagram showing logical architecture and data flow for a fourth embodiment system according to the present invention.

Shown in FIG. 8 is a high-level architecture view of system 800, an embodiment of the present invention. System 800 includes: central management/cloud platform 810; incoming packets 801 and 802; classifier 812; control module 814, and inspector instances 822, 824, and 826. Classifier 812 forwards incoming packets 801 and 802 on to control module 814, which in turn forwards each packet on to an appropriate inspector instance. Control module 814 also performs protocol complexity analysis, spawning new inspector instances (or destroying old ones) as indicated by the results. In some embodiments, classifier 812 may forward all or some incoming packets directly to appropriate inspector instances (inspector engines), while control module 814 is only responsible for the protocol complexity analysis and adjusting the number and type of inspector instances accordingly. In some embodiments, protocol analysis may be distributed, such as by having multiple control modules share the workload of protocol analysis by packet type or geography, with results made available to other control modules as need be for their own analyses or routing of traffic to inspector instances.

Figure 9:
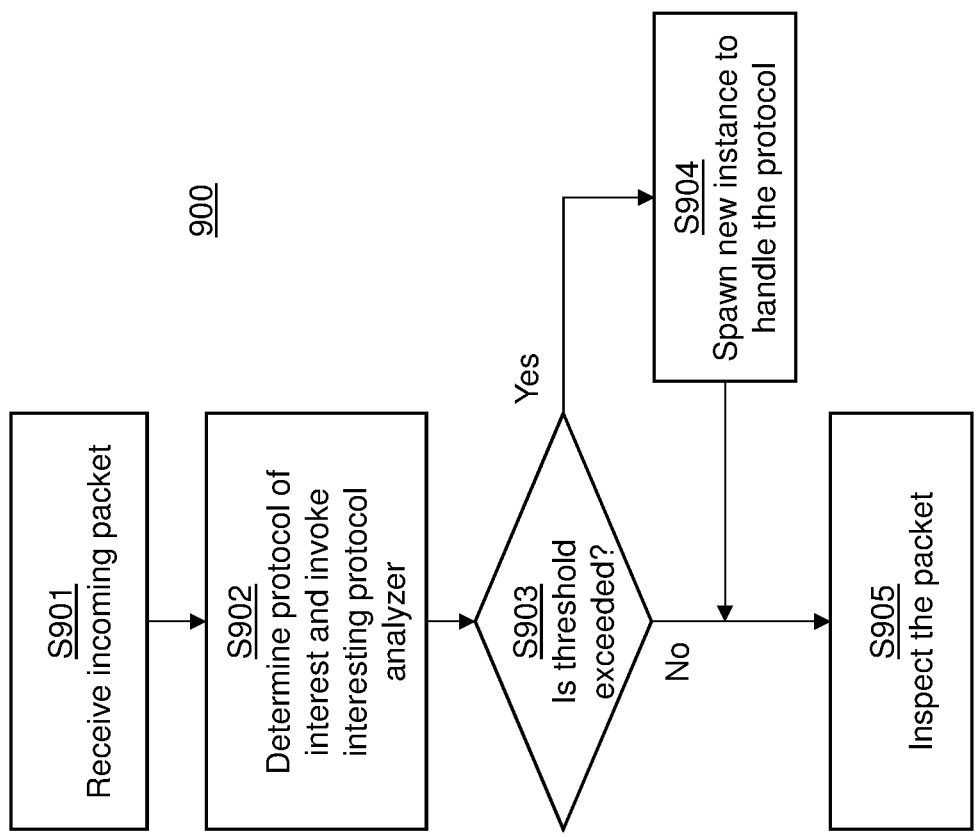
FIG. 9 is a flowchart showing a second embodiment method performed, at least in part, by the fourth embodiment system.

Shown in FIG. 9 is flowchart 900, detailing the functional decision aspect of the protocol complexity analysis of system 800, as carried out (at least in part) by control module 814 (see FIG. 8). In step S901, an incoming packet is received. In step S902, the protocol type is determined and, if it is a protocol of interest, an interesting protocol analyzer is invoked. The interesting protocol analyzer provides dynamic input to generate a threshold or threshold list from a protocol complexity indicator (PCI, described further below) and containing protocol type and protocol throughput limitations (such as via <protocol, threshold> pairs). In step S903, the threshold for the protocol at hand is checked via the list. If the latest data put traffic of that protocol over the corresponding threshold, the system spawns a new instance of the network analyzer component(s) (for example, a new inspector engine) needed to keep throughput at or above the minimum acceptable level (step S904). Finally, the packet is inspected in step S905.

Shown in FIG. 10 is flowchart 1000, detailing the functioning of the protocol complexity indicator (PCI) mentioned above. In step S1001, the system accepts user input specifying a minimum acceptable throughput. In step S1002, the system determines the relationship between protocol throughput (as a percentage of total throughput) and overall throughput. In this embodiment, this is done by developing interesting protocol line graph data through network data sampling and analytics. From these two sources of data—the minimum acceptable throughput and the line graph data—the system generates a threshold list—a list of throughput thresholds by protocol type—representing the percentage of total network traffic below which the respective protocol must remain to maintain the desired minimum throughput level. This is step S1003.

Shown in FIG. 11 is diagram 1100, demonstrating the concept of constructing a threshold list. In this case, three line graph data sets (constructed from real-time statistics) are consulted: 1102 for HTTPS protocol throughput data, 1104 for HTTP protocol throughput data, and 1106 for DNS protocol throughput data. These data sets relate protocol throughput as a percentage of total throughput to absolute overall throughput. From this data, threshold list 1110 is constructed. For example, given a total secured throughput of 5 Gbps and a user-input minimum acceptable (secured) throughput of 2 Gbps, line graph 1102 is consulted to determine that to guarantee this level of throughput given current protocol complexities, HPPTS traffic must correspond to 10% or less of total inspected traffic. In other words, When HTTPS traffic consumes 10% of the total secured throughput, the user-input desired minimum accepted throughput cannot be guaranteed, so a new instance of the appropriate network analyzer component(s) must be spawned. The percentage (10%) is obtained from the appropriate real-time statistics graph. Similarly, line graphs 1104 and 1106 are consulted in a similar fashion for HTTP and DNS protocols to give thresholds of 50% and 90%, respectively (note: the DNS graph of FIG. 12C is constructed under an environment that is different from the environment used to construct the graphs of FIGS. 12A and 12B).

Figure 12A:
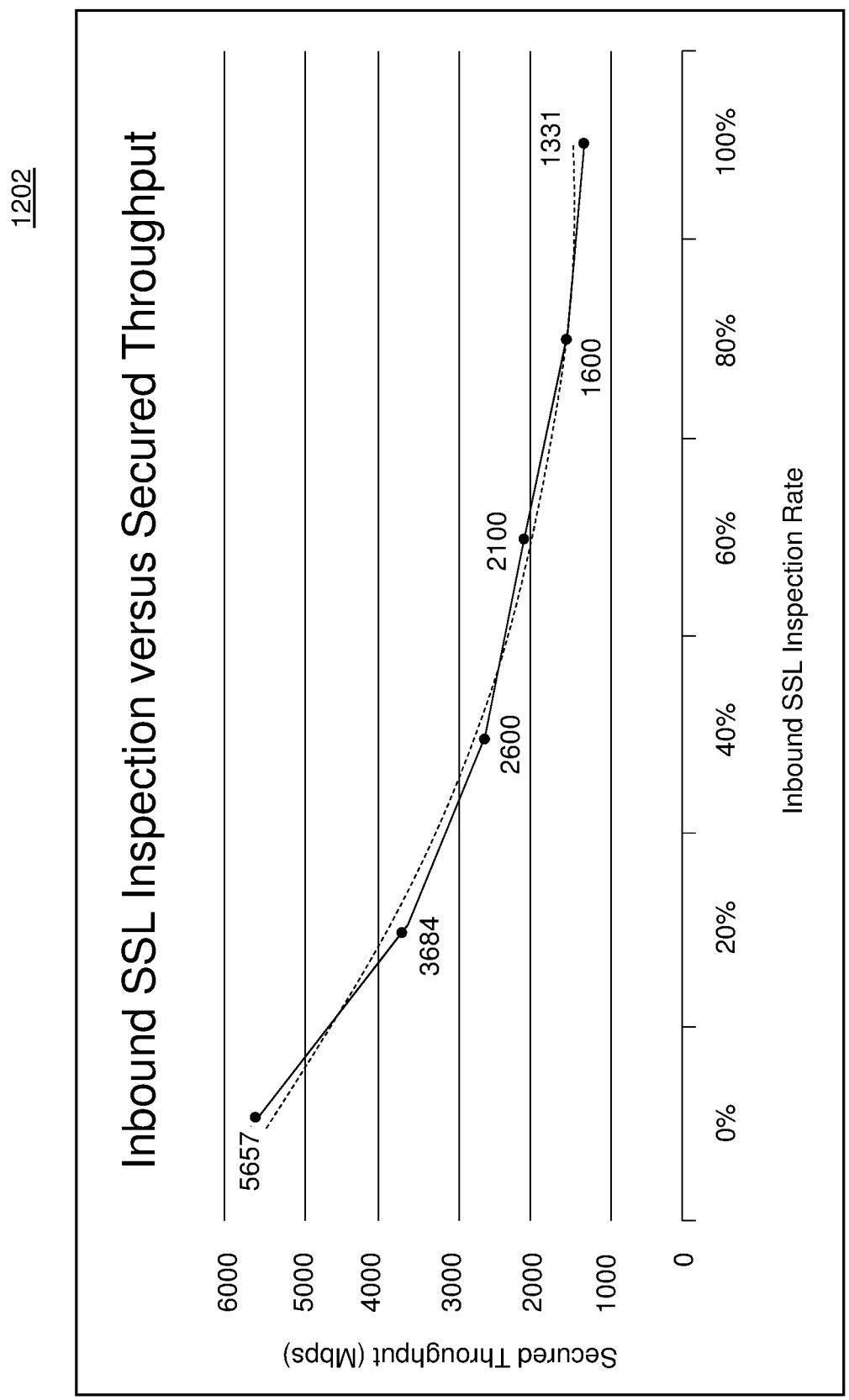
FIGS. 12A, 12B, and 12C are graphs showing information generated by a fifth embodiment system and used for threshold determination according to the present invention.
Figure 12B:
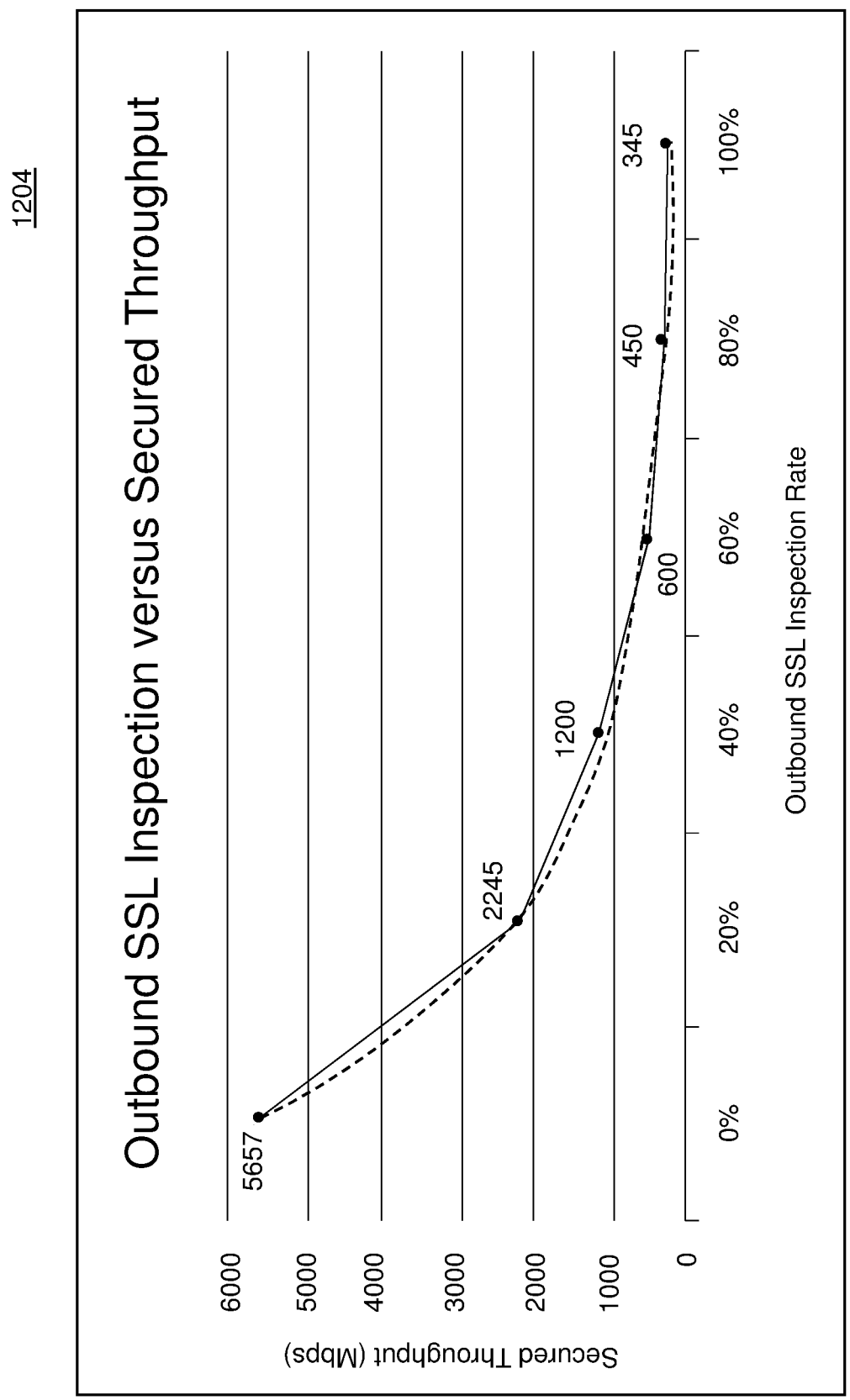
Figure 12C:
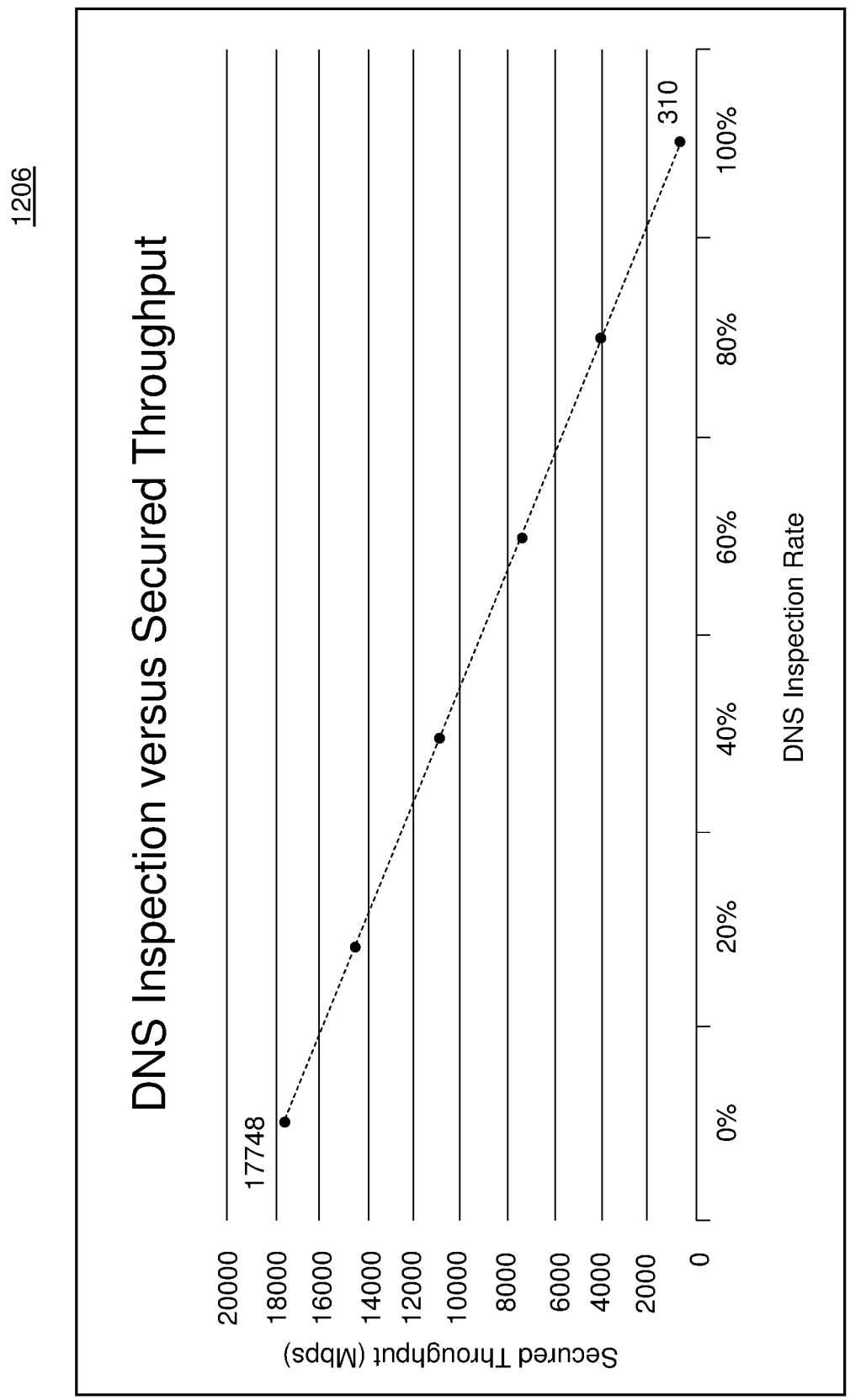

FIGS. 12A, 12B and 12C, show graphs 1202, 1204, and 1206, respectively. Each graph maps inspection rate of a particular protocol (in this case, inbound SSL, outbound SSL, and DNS) to total secured throughput. Both linearly interpolated and smoothed lines are shown, where the solid line represents the connection of real traffic data—that is, the data collected during real-time statistics operations—and the dotted line represents adjusted data for the real traffic data. The DNS chart here is measured from a different hardware model than that used for the SSL charts. Therefore, the total traffic outputs between these two groups are quite different. For the DNS protocol graph, the total secure throughput is more or less around 18 Gbps, while the user-specified minimum is around 6 Gbps, giving a throughput of about 70%. Because the graph is constructed from real-time statistics, this is going to change periodically in order to reflect then-current network conditions (such as changing average complexities of the protocols of interest).

These three graphs are examples only, pre-generated for a hardware model. In a real environment, the actual numbers will not be exact, but they should be very close, because the inspection complexity for the same protocol should be very close. The charts here are mere estimations and can always be regenerated to fit a real environment. The graph is a real scenario graph. This only represents one of many scenarios that a user may encounter in the field. It is likely that a user can have a different scenario, in which case he/she could generate a graph for that scenario.

Returning to the example of FIGS. 8-11, control module 814 (see FIG. 8) checks and records a portion of each protocol of interest when a traffic session is going through security inspection. The PCI is developed from data, collected over certain sample sizes and running time periods, representing the complexity of each type of network traffic of interest. From this data the security infrastructure can make logical predictions, maintain throughput consumption, and produce a threshold list of each protocol of interest. A new virtual machine (VM) instance is spawned if certain protocol process components are needed to maintain stable and/or adequate throughput.

In this embodiment, the spawning mechanism works in the following way. Total secured throughput is calculated as the sum of the secured throughput for each complex protocol. In formula notation:

$$Throughput_{TotalSecured} = \sum_{i=1}^{n} CP_i$$

where classifying a protocol as "complex" is pre-defined by a user. It is typically a combination of protocols used in real-time traffic and is adjustable. A resource allocator value for each complex protocol is then computed as:

$$ResourceAllocator_{CP} = \frac{Throughput_{TotalSecured} - f_{CP}(x)}{Throughput_{TotalSecured}}$$

where $f_{CP}(x)$ is the cumulative throughput of a particular protocol. Resource allocator refers to an available resource. When a particular protocol increases its throughput, the available resource is decreased. Resource allocator is a program or device that processes a request to spawn a new instance of a network analyzer component. When ResourceAllocator$_{CP}$ decreases to a certain threshold value, a new instance is spawned.

Some embodiments of the present invention may include one, or more, of the following features, characteristics and/or advantages: (i) provide a way of analyzing packets with flexible resource allocation—network protocols vary greatly in complexity, with some network protocols consuming more resources than others; therefore, resources are allocated based on network protocol complexity; for example, network protocols such as SSL or HTTP are allocated more resources; (ii) provide a highly scalable solution that can be run on traditional appliance hardware as well as directly from the same cloud platform as the services it protects; (iii) efficiently utilize resources, adjusting the resources consumed in response to changes in network traffic without the difficulty of traditional physical appliances of determining how many appliances are needed when facing network traffic shapes that are unpredictable; eliminate unnecessary use of resources; (iv) provide a highly customizable solution—because it is component based, administrators can adopt components that are relevant to their own cloud infrastructure and business needs, and/or administrators can customize the threshold a network protocol needs to reach before new resources are allocated to it.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar caution apply to the term "embodiment."

and/or: inclusive or; for example, A, B "and/or" C means that at least one of A or B or C is true and applicable.

Including/include/includes: unless otherwise explicitly noted, means "including but not necessarily limited to."

Responsive to: unless otherwise explicitly noted, denotes a non-exclusive condition, such that other conditions may contribute to the overall outcome; for example, "responsive to X" includes within its scope "responsive to X and Y", where the condition "not Y" would result in the stated outcome not occurring.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   determining a plurality of Protocol Complexity Indicator (PCI) values respectively corresponding to a plurality of network data communication protocols, with each PCI value of the plurality of PCI values provides an indication of the level of system throughput that can be sustained for a given quantity of traffic under the respectively corresponding data communication protocol;
   creating a PCI mapping data set mapping the plurality of data communication protocols to their respectively corresponding PCI values;
   receiving a predicted network traffic volume data set including information indicative of an expected total amount of network traffic and expected volume of network traffic under each protocol of the plurality of data communication protocols;
   determining an amount of network bandwidth needed to handle the total amount of expected network traffic at a given speed based, at least in part, upon the expected network traffic under each protocol of the plurality of data communication protocols and the respectively corresponding PCI values of the PCI mapping table;
   using a first PCI value for a first data communication protocol to determine that a new instance of a network analyzer component for the first data communication protocol should be spawned to maintain throughput at or above a specified level; and
   responsive to the determination that a new instance of a network analyzer component for the first data communication protocol should be spawned, spawning a new instance of a network analyzer component for the first data communication protocol.

2. The method of claim 1 further comprising:
   determining an allocation of data communication network resources based, at least in part, upon the amount of network bandwidth needed to handle the total amount of expected network traffic at a given speed.

3. A computer program product (CPP) comprising:
   a non-transitory data storage medium; and
   computer code stored on the medium, with the computer code including machine readable data and instructions for causing a processor(s) set to perform at least the following operations:
   determining a plurality of Protocol Complexity Indicator (PCI) values respectively corresponding to a plurality of network data communication protocols, with each PCI value of the plurality of PCI values provides an indication of the level of system throughput that can be sustained for a given quantity of traffic under the respectively corresponding data communication protocol,
   creating a PCI mapping data set mapping the plurality of data communication protocols to their respectively corresponding PCI values,
   receiving a predicted network traffic volume data set including information indicative of an expected total amount of network traffic and expected volume of network traffic under each protocol of the plurality of data communication protocols,
   determining an amount of network bandwidth needed to handle the total amount of expected network traffic at a given speed based, at least in part, upon the expected network traffic under each protocol of the plurality of data communication protocols and the respectively corresponding PCI values of the PCI mapping table,
   using a first PCI value for a first data communication protocol to determine that a new instance of a network analyzer component for the first data communication protocol should be spawned to maintain throughput at or above a specified level, and
   responsive to the determination that a new instance of a network analyzer component for the first data communication protocol should be spawned, spawning a new instance of a network analyzer component for the first data communication protocol.

4. The CPP of claim 3 wherein the computer code further includes machine readable data and instructions for causing the processor(s) set to perform the following operation:
   determining an allocation of data communication network resources based, at least in part, upon the amount of network bandwidth needed to handle the total amount of expected network traffic at a given speed.

5. A computer system (CS) comprising:
   a processor(s) set;
   a non-transitory data storage medium; and
   computer code stored on the medium, with the computer code including machine readable data and instructions for causing the processor(s) set to perform at least the following operations:
   determining a plurality of Protocol Complexity Indicator (PCI) values respectively corresponding to a plurality of network data communication protocols, with each PCI value of the plurality of PCI values provides an indication of the level of system throughput that can be sustained for a given quantity of traffic under the respectively corresponding data communication protocol, creating a PCI mapping data set mapping the plurality of data communication protocols to their respectively corresponding PCI values, receiving a predicted network traffic volume data set including information indicative of an expected total amount of network traffic and expected volume of network traffic under each protocol of the plurality of data communication protocols, determining an amount of network bandwidth needed to handle the total amount of expected network traffic at a given speed based, at least in part, upon the expected network traffic under each protocol of the plurality of data communication protocols and the respectively corresponding PCI values of the PCI mapping table, using a first PCI value for a first data communication protocol to determine that a new instance of a network analyzer component for the first data communication protocol should be spawned to maintain throughput at or above a specified level, and responsive to the determination that a new instance of a network analyzer component for the first data communication protocol should be spawned, spawning a new instance of a network analyzer component for the first data communication protocol.

6. The CS of claim 5 wherein the computer code further includes machine readable data and instructions for causing the processor(s) set to perform the following operation:

determining an allocation of data communication network resources based, at least in part, upon the amount of network bandwidth needed to handle the total amount of expected network traffic at a given speed.

* * * * *